United States Patent [19]

Nagashima

[11] Patent Number: 5,724,661
[45] Date of Patent: Mar. 3, 1998

[54] CORDLESS TELEPHONE SYSTEM WHICH CONVERTS A PROTOCOL FOR CALL CONNECTION

[75] Inventor: Masaru Nagashima, Tokyo, Japan

[73] Assignee: NEC Corporation, Tokyo, Japan

[21] Appl. No.: 578,863

[22] Filed: Dec. 27, 1995

[30] Foreign Application Priority Data

Dec. 28, 1994 [JP] Japan ...................................... 6-337477

[51] Int. Cl.⁶ ...................................................... H04Q 7/30
[52] U.S. Cl. ........................ 455/462; 455/561; 370/95.1
[58] Field of Search .................................. 379/58, 61, 93, 379/94, 91, 156; 370/95.1; 455/462, 561

[56] References Cited

U.S. PATENT DOCUMENTS

| | | | |
|---|---|---|---|
| 4,661,659 | 4/1987 | Nishimura | 379/61 |
| 4,937,852 | 6/1990 | Manzarek . | |
| 5,010,565 | 4/1991 | Nash et al. | 379/61 |
| 5,081,668 | 1/1992 | Ito | 379/58 |
| 5,117,423 | 5/1992 | Shepherd et al. | 370/95.1 |
| 5,128,981 | 7/1992 | Tsukamoto et al. | 379/58 |
| 5,263,078 | 11/1993 | Takahashi et al. | 379/58 |
| 5,327,481 | 7/1994 | Horimoto | 379/58 |
| 5,327,483 | 7/1994 | Kikuchi . | |

FOREIGN PATENT DOCUMENTS

| | | |
|---|---|---|
| 0265943 | 4/1988 | European Pat. Off. . |
| 5236551 | 3/1993 | Japan . |
| 1115315 | 5/1968 | United Kingdom . |
| 1412386 | 11/1975 | United Kingdom . |
| 2138656 | 10/1984 | United Kingdom . |
| 2155279 | 9/1985 | United Kingdom . |
| WO9529566 | 11/1995 | WIPO . |

*Primary Examiner*—William Cumming
*Attorney, Agent, or Firm*—Ostrolenk, Faber, Gerb & Soffen, LLP

[57] ABSTRACT

A cordless telephone system includes a subscriber line interface wired to a subscriber line, and cordless terminal connected to the subscriber line interface via a radio communication. The subscriber interface includes only interface conversion means for performing conversion between a wired signal of the subscriber line and a radio signal of the cordless terminal and means for call connection. In the cordless terminal, it is only required to provide the radio interface circuit which can communicate with the radio interface portion of the subscriber line interface, and a telephone function circuit for enabling connection with the subscriber network. Therefore, the telephone system can be established with employing an arbitrary terminal.

7 Claims, 3 Drawing Sheets

CORDLESS TELEPHONE SYSTEM WHICH CONVERTS A PROTOCOL FOR CALL CONNECTION

BACKGROUND OF THE INVENTION

1. Field of the Invention

The present invention relates to a cordless telephone system. More specifically, the invention relates to a cordless telephone system which enables generalization of a cordless terminal set.

2. Description of the Related Art

Conventionally, a cordless telephone system includes a master set wired to a subscriber line and a cordless slave terminal set connected with the master set by radio communication. In the master set, an interface circuit for connection with the subscriber line, a telephone function circuit for call connection and service to a subscriber network via the interface circuit, and a radio interface circuit for radio connection with the cordless slave terminal set are included. Also, the cordless slave terminal set includes a radio interface for radio connection with the master set and a circuit for converting a voice signal and call signal into a radio signal. With such construction, exchange of signals between the master set and the cordless slave terminal set is performed by a predetermined specific signal (signal protocol) unique to the specific model. For instance, when the master set receives an arrival call, the master set converts command for "ring" or "indicate call arrival" to the cordless slave terminal set and transmit such commands with conversion into unique signal. Such unique signal includes signal from the cordless slave terminal set to the master set, such as "call button is depressed", "dial 1 is depressed" and so forth. These signals are specific and unique in the combination of the master set and the slave terminal set and cannot be effective for other slave terminal set. The slave terminal simply performs the command function on the basis of the signal (command) from the master set.

For example, Japanese Unexamined Patent Publication (Kokai) No. Heisei 5-236551 discloses an HA system which can be established irrespective of the scale of the system. The disclosed system includes a master set connected to a system transmission line through an interface, and a slave terminal set communicated with the master system by radio communication. In the master system, in addition to a radio interface circuit for radio connection with the slave terminal set, a circuit for performing telephone function via the transmission line or external line is provided, as set forth above.

In such circumstance, the slave terminal set in the conventional cordless telephone system has to have a signal processing protocol adapted to the corresponding to that of the master set. This fixes up the combination between the slave terminal set and the master set. Therefore, the slave terminal set cannot be generalized. Therefore, when the slave terminal set from other maker or the slave set of different master set is to be used, it is inherent to have the master set to be combined therewith.

On the other hand, in the recent years, various functions, such as automatic answering and recording function and so forth, are provided for the master set. When the master set is changed, it is inherent to change the slave terminal set. Also, when a portable computer or facsimile machine is connected to the subscriber line, these equipment should be directly and physically connected to the subscriber line, or be physically connected to the slave terminal set. Therefore, when a cable for such connection is not accompanied, connection of such equipment to the subscriber line becomes impossible.

SUMMARY OF THE INVENTION

In view of the inconvenience in the prior art, it is an object of the present invention to provide a cordless telephone system which enables generalization of a slave terminal set or communication terminal and facilitates connection of such slave terminal set or communication terminal to a subscriber line.

According to the present invention, a cordless telephone system comprises:

a subscriber line interface wired to a subscriber line; and a cordless terminal connected to the subscriber line interface via a radio communication, the subscriber interface including only interface conversion means for performing conversion between a wired signal of the subscriber line and a radio signal of the cordless terminal.

In the preferred construction, the interface conversion means of the subscriber line interface may include a network interface portion for establishing interface with a subscriber network, a radio interface portion for radio interface with the cordless terminal, and a control portion performing call connecting operation. The interface conversion means may operate with a standardized protocol.

The cordless terminal may include at least a radio interface for radio connection with the subscriber line interface, and a telephone function circuit, an automatic answering and recording telephone set having an automatic answering and recording mechanism, a computer circuit and/or a facsimile.

The cordless telephone system may have a wired signal at the side of the subscriber line side and the radio signal at the side of the cordless terminal are both digital signals having a common signal format.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of a telephone system according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
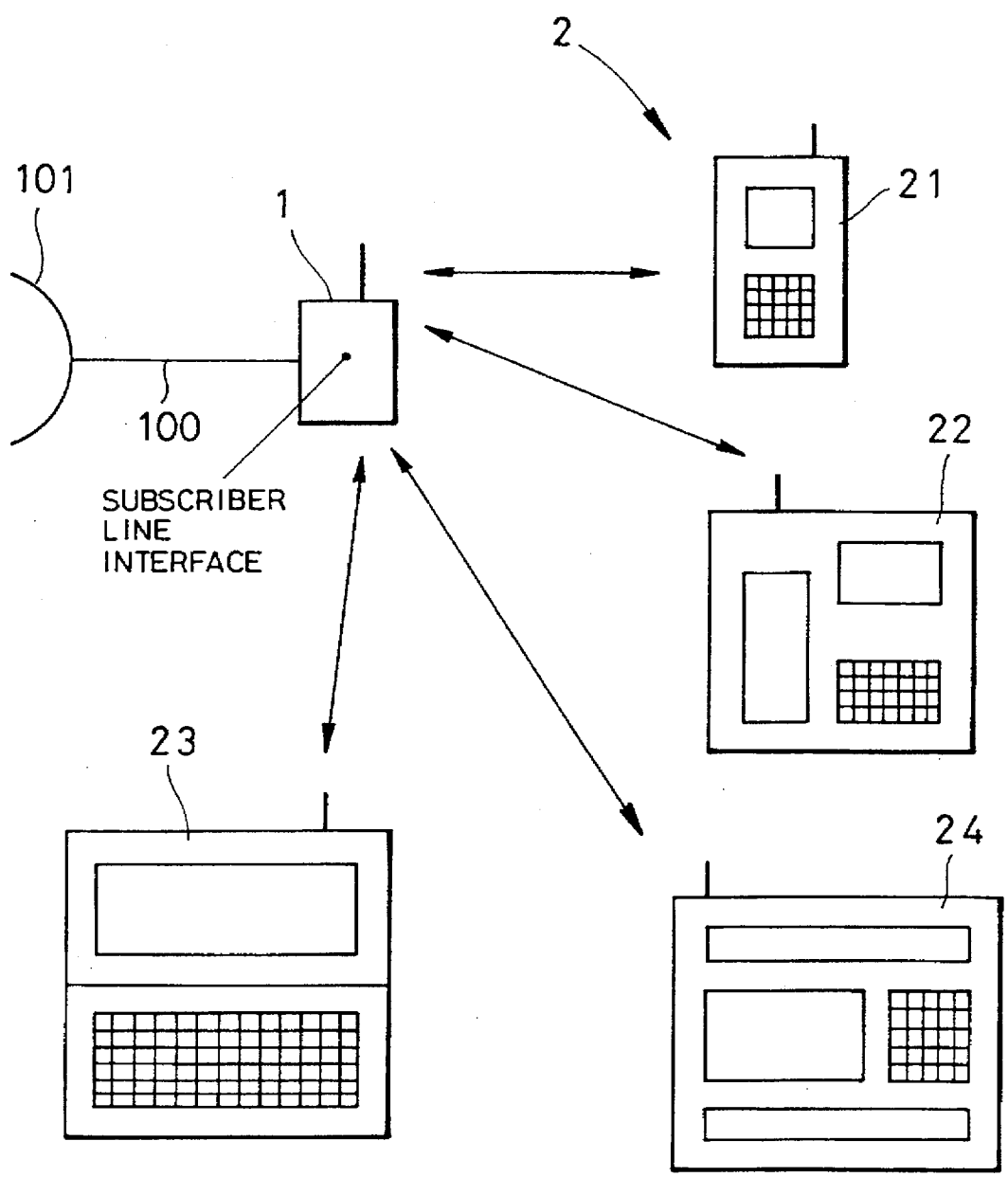
FIG. 1 is a conceptual illustration of the preferred embodiment of a telephone system according to the present invention.

FIG. 1 is an illustration showing a concept of a system construction in one embodiment of the present invention.

The shown system includes a subscriber line interface 1 wired to a subscriber line 100 which is connected to a subscriber net work 101, and one or more cordless terminal sets which are generally identified by the reference numeral 2. In the shown embodiment, a portable telephone set 21, a telephone set 22 with an automatic answering and recording function, a portable personal computer 23, and a portable facsimile machine 24 are provided as the cordless terminal sets.

Figure 2:
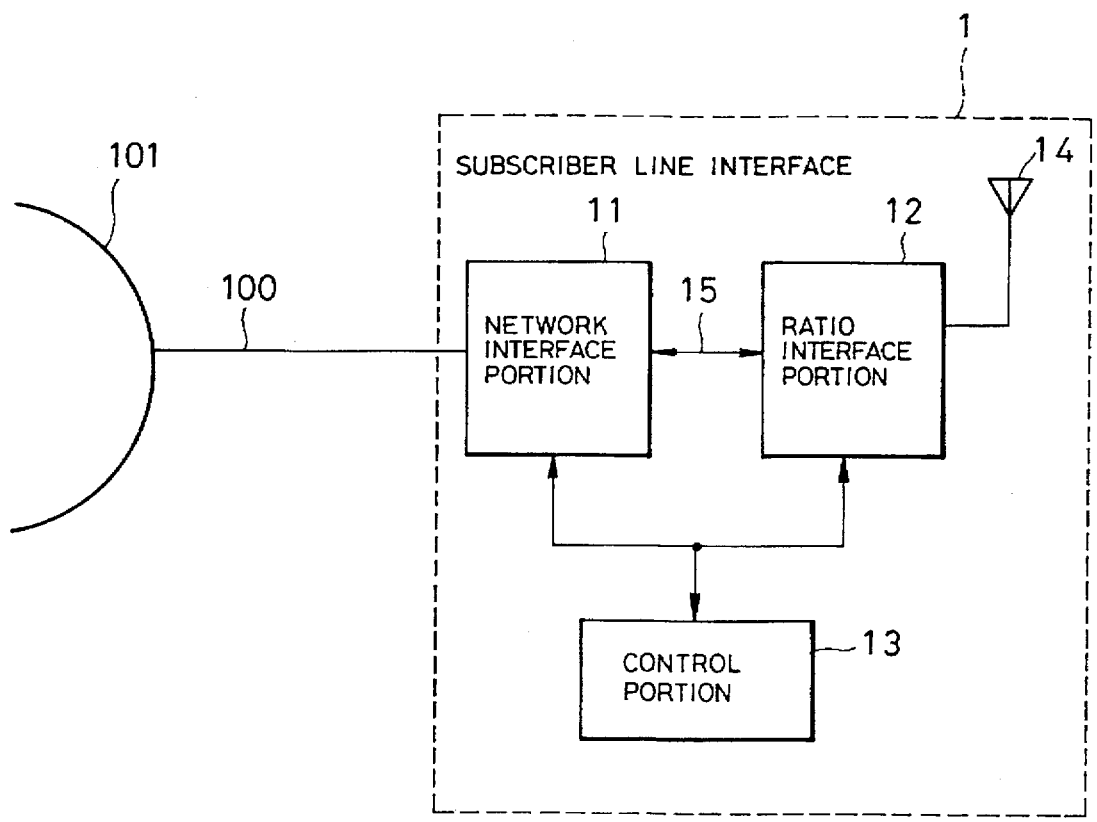
FIG. 2 is a block diagram showing an internal structure of a subscriber line interface.

FIG. 2 is a block diagram showing the construction of the subscriber line interface 1. The subscriber line interface 1 includes a network interface portion 11 for establishing an interface with a subscriber network connected to the subscriber line, a radio interface portion 12 converting a signal, on which matching with the subscriber network 101 is established by the network interface 11 (signal on a line 15) into a radio frequency signal for establishing interface with the cordless terminal sets, and a control portion for controlling the network interface portion 11 and the radio interface portion 12. In the radio interface portion 12, an antenna 14 is provided for radio communication.

The network interface portion 11 and the radio interface portion 12 are directly and physically connected via a line 15 for service and data transmission for directly transmitting and receiving signals therebetween. Also, the network interface portion 11 and the radio interface portion 12 are connected to the control portion 13. A protocol for call connection is extracted by respective interface portion and then converted into the signal to be processed by the subscriber network 101 or the cordless terminal set by the control portion.

Figure 3A:
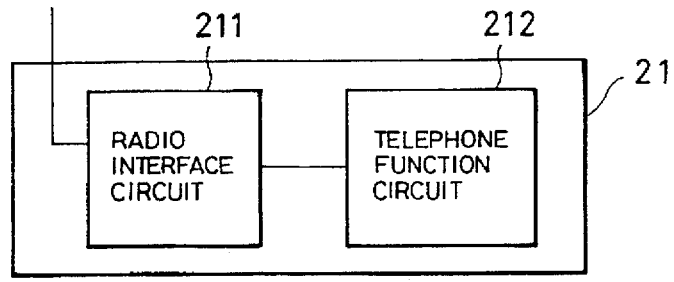
FIG. 3 is a block diagram showing an internal structure of various terminals.
Figure 3B:
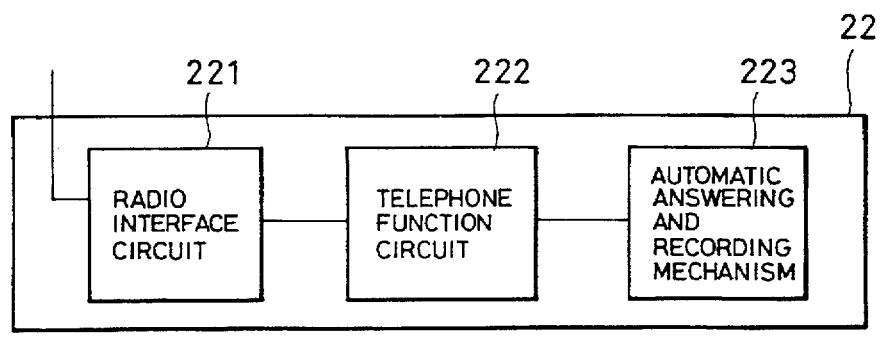

On the other hand, in the cordless terminal set 2, the portable telephone set 21 has a radio interface circuit 211 which can communicate with the radio interface portion 12 of the subscriber line interface 1 and a general telephone function circuit 212 connected to the radio interface circuit 211, as shown in FIG. 3A. The telephone set 22 having the automatic answering and recording function has a radio interface circuit 221 which can communicate with the radio interface portion 12 of the subscriber line interface 1, a general telephone function circuit 222 connected to the radio interface circuit 221, and an automatic answering and recording mechanism 223, as shown in FIG. 3B.

Figure 3C:
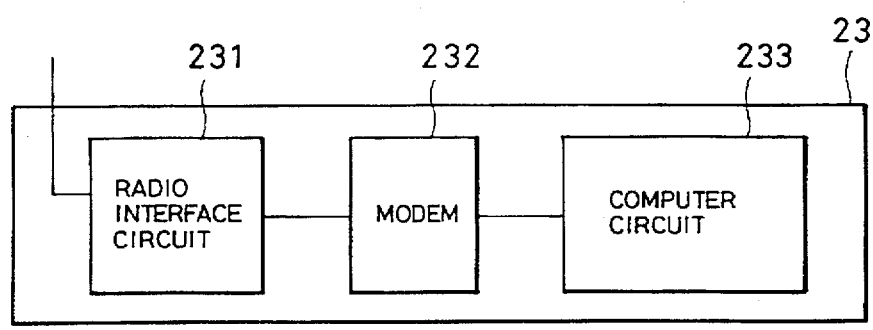
Figure 3D:
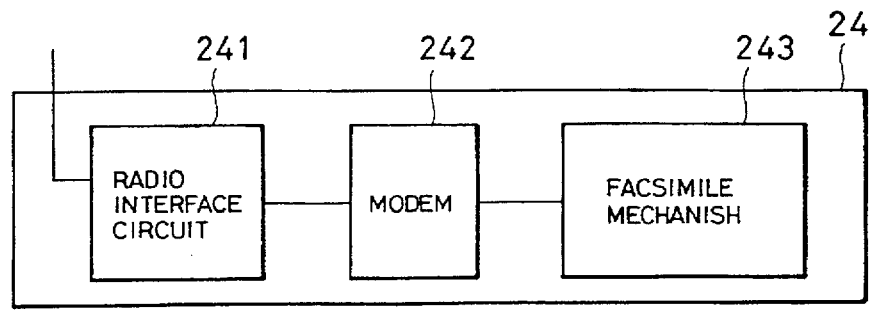

On the other hand, the portable computer 23 as the cordless terminal machine has a radio interface circuit 231 communicated with the radio interface portion 12 of the subscriber line interface 1, a modem 232 connected to the radio interface and a computer circuit 233, as shown in FIG. 3C. Furthermore, the portable facsimile 24 has a radio interface circuit 241 communicated with the radio interface portion 12 of the subscriber line interface 1, a modem 242 connected to the radio interface circuit 241, and a facsimile mechanism 243, as shown in FIG. 3D.

Here, respective radio interface circuits 211, 221, 231 and 241 of the portable telephone set 21, the automatic answering and recording telephone set 22, the portable personal computer 23 and the portable facsimile 24 are detachable from main bodies thereof so that they may be replaced with the interface circuits adapted for other radio frequency, protocol and so forth. Namely, the interface circuits may be replaced to those adapted to the standard of the radio interface portion 12 provided in the subscriber line interface 1. In the alternative, respective radio interface circuits 211, 221, 231, 241 may incorporate switches for varying standard adapting to the radio interface portion 12 of the subscriber line interface 1. Also, ID numbers (record number recorded in a ROM cartridge or so forth) unique to respective of terminals may be provided in the radio interface circuits 211, 221, 231, 241.

Accordingly, with the cordless telephone system, when the cordless terminal is the portable telephone set, if call operation is performed on the portable telephone, a call signal from the telephone function circuit 212 is converted into the radio signal by the radio interface circuit 211 and then transmitted through the antenna. The radio signal is received by the radio interface portion 12 of the subscriber line interface and converted into the protocol of the call signal by the control portion 13. Then, the call signal is transmitted from the network interface portion 11 to the subscriber network 101 through the subscriber line 100.

Then, a response signal from a remote telephone set is transmitted through the subscriber network 101 to the network interface portion 11. Then, the control portion 13 processes the response signal and transmit to the cordless terminal in a form of the radio signal. The radio signal is received by the antenna of the portable telephone set 21 and converted into the electric signal in the radio interface circuit 211. Thus, call connection is established in the telephone function circuit 212. Subsequently, service is performed by transmission and reception of the voice signals. At this time, in the subscriber interface 1, direct communication is established between the network interface portion 11 and the radio interface portion 12 via the line 15.

Similar operation would be performed in the automatic answering and recording telephone set 22, the portable personal computer 23 and the personal facsimile 24. Namely, by connection with the subscriber line interface 1 via radio communication as in the portable telephone set 21, call connection to the remote terminal connected to the subscriber network 101 can be possible. Subsequently, talking and/or data communication can be performed.

In such system, since the subscriber line interface 1 simply have the interface function between the radio communication system and the subscriber network, and standardized communication protocol for establishing call connection. Therefore, by providing the radio interface circuits 211, 221, 231, 241 corresponding to the subscriber line interface 1 and the telephone function circuits 212, 222 or the modem 232, 242, it becomes possible to establish connection to the subscriber line interface 1 and thus to the line to the subscriber network 101. Accordingly, by adapting to the tastes of the user, the terminal can be purchased for establishing arbitrary telecommunication systems.

In order word, by moving the telephone function circuit which has been provided in the master set (subscriber line interface 1) to the cordless terminal set, it is only required to convert the signal transmitted through the subscriber network 101 into the radio signal to transmit to the cordless terminal set. Therefore, compatibility of the master set and slave set can be achieved.

Here, in the subscriber line interface 1, in order to avoid crosstalk with the adjacent other subscriber interface portion, the radio frequency is set at unique frequency. Accordingly, the radio interface circuit of respective terminal should be set adapting to the radio frequency set in the corresponding subscriber line interface. Such setting of the radio frequency may be simply performed by preliminarily providing a plurality of channels in the radio interface portion and the radio interface circuits, and by setting channel of respective radio interface of respective terminals. Therefore, parts replacement and special parts is not required at all.

It should be noted that the present invention is applicable not only for the analog line but also for digital line. In case of the digital line, ISDN (Integrated Services Digital Network) line or other digital line may be employed as the subscriber line, and a digital radio telephone can be required to be employed.

In this case, communication from the subscriber network 101 to the network interface 11 in the subscriber line interface portion 11 is performed by a digital signal transmitted on the basis of a signal processing protocol unique in the ISDN. On the other hand, the communication between the subscriber line interface portion 11 included in the subscriber line interface 1 and the cordless terminal set 2 is performed by a digital signal transmitted on the bases of a signal processing protocol unique in the cordless terminal set 2. Accordingly, by adapting the signal format at the side of the cordless terminal set 2 to the signal format at the side of the subscriber line interface portion 11, equivalent service to the case of analog circuit can be achieved.

As set forth above, the present invention is constructed with the subscriber line interface wired to the subscriber line and one or more cordless terminal set connected or communicated with the subscriber line interface via radio communication. The subscriber interface has only means for performing network/radio interface conversion and a standardized protocol for call connection. Therefore, the call signal and speech signal transmitted from the terminal set is converted into the radio signal by the radio interface. The radio signal is then received by the radio interface of the subscriber line interface and transmitted to the subscriber network through the network interface of the subscriber line interface and the subscriber line. Thus, connection between the terminal set and the subscriber network can be established.

By this, the subscriber line interface is only required the interface function between radio and network and call connecting function. On the other hand, the terminal set is required the radio interface adapted to the subscriber line interface and individual communication function such as individual telephone function circuit and so forth, to establish connection with the subscriber line interface and this to the subscriber network. Therefore, the user may freely select the terminal set adapting to own taste to arbitrarily establish own communication system. Also, generalization of the terminal set can be achieved.

Also, as the cordless terminal set, the portable telephone set, the automatic answering and recording telephone set, the portable personal computer and portable facsimile and so forth can be used for further improving freedom in selecting equipments to be used with the telephone system.

Furthermore, when both of the wired signal at the side of the subscriber line and the radio signal at the side of the cordless terminal set are a digital signal having common signal format, the system according to the present invention is applicable for a digital signal circuit.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cordless telephone system comprising:
   a subscriber line interface wired to a subscriber line of a subscriber network; and
   a cordless terminal connected to said subscriber line interface via a radio communication connection,
   said subscriber line interface including only interface conversion means for performing conversion between a wired signal of said subscriber line and a radio signal of said cordless terminal,
   said interface conversion means of said subscriber line interface including a network interface portion for establishing interface with the subscriber network, a radio interface portion for radio interface with said cordless terminal and a control portion which converts a protocol for call connection into a signal to be processed by at least one of said subscriber network and said cordless terminal.

2. A cordless telephone system as set forth in claim 1, wherein said interface conversion means operates with a standardized protocol.

3. A cordless telephone system as set forth in claim 1, wherein said cordless terminal includes at least a radio interface for radio connection with said subscriber line interface, and a telephone function circuit.

4. A cordless telephone system as set forth in claim 1, wherein said cordless terminal includes at least a radio interface for radio connection with said subscriber line interface and an automatic answering and recording telephone set having an automatic answering and recording mechanism.

5. A cordless telephone system as set forth in claim 1, wherein said cordless terminal includes at least a radio interface for radio connection with said subscriber line interface, a modem and a computer circuit.

6. A cordless telephone system as set forth in claim 1, wherein said cordless terminal includes at least a radio interface for radio connection with said subscriber line interface, a modem and a facsimile.

7. A cordless telephone system as set forth in claim 1, wherein said wired signal at the side of said subscriber line side and said radio signal at the side of said cordless terminal are both digital signals having a common signal format.

* * * * *